US009556005B2

(12) United States Patent
Srb-Gaffron et al.

(10) Patent No.: US 9,556,005 B2
(45) Date of Patent: Jan. 31, 2017

(54) SELF-CLAMPING HANDRAIL DRIVE

(71) Applicant: OTIS ELEVATOR COMPANY, Farmington, CT (US)

(72) Inventors: Walter Srb-Gaffron, Baden (AT); Alexander Turek, Vienna (AT); Rainer Stummer, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/773,931

(22) PCT Filed: Mar. 14, 2013

(86) PCT No.: PCT/US2013/031439
§ 371 (c)(1),
(2) Date: Sep. 9, 2015

(87) PCT Pub. No.: WO2014/142891
PCT Pub. Date: Sep. 18, 2014

(65) Prior Publication Data
US 2016/0016760 A1 Jan. 21, 2016

(51) Int. Cl.
*B65G 23/20* (2006.01)
*B66B 23/20* (2006.01)
*B66B 23/04* (2006.01)

(52) U.S. Cl.
CPC ............... *B66B 23/20* (2013.01); *B66B 23/04* (2013.01)

(58) Field of Classification Search
CPC ........ B66B 23/02; B66B 23/028; B66B 23/20; B66B 23/04
USPC ................................ 198/330, 335, 338, 336
See application file for complete search history.

(56) References Cited

U.S. PATENT DOCUMENTS 3,666,075 A 5/1972 Iwata
4,535,880 A * 8/1985 Boltrek .................. B66B 23/02 198/330
4,998,613 A * 3/1991 Rivera .................... B66B 23/04 198/335
5,117,960 A 6/1992 Ahls et al.
(Continued)

FOREIGN PATENT DOCUMENTS

CN 1592713 A 3/2005
CN 1689953 A 11/2005
(Continued)

OTHER PUBLICATIONS

International Search Report for application PCT/US2013/031439, dated Dec. 13, 2013, 5 pages.
(Continued)

*Primary Examiner* — James R Bidwell
(74) *Attorney, Agent, or Firm* — Cantor Colburn LLP

(57) ABSTRACT

A self-clamping handrail device includes a belt-handrail compound comprising a first belt, a second belt coupled to the first belt, and a handrail coupled to the second belt, a counter bar and a clamping frame configured to support the belt-handrail compound as the belt-handrail compound passes between the counter bar and the clamping frame, the clamping frame configured to move about a clamping curve based on a tension force applied to the handrail, and the first belt and the second belt applying a normal force to the handrail based at least in part on the tension force.

22 Claims, 5 Drawing Sheets

(56) References Cited

U.S. PATENT DOCUMENTS

| | | | | |
|---|---|---|---|---|
| 5,133,443 | A * | 7/1992 | Johnson .................. | B66B 23/04 198/335 |
| 5,366,060 | A | 11/1994 | Johnson et al. | |
| 5,372,232 | A | 12/1994 | Ahls et al. | |
| 5,645,156 | A | 7/1997 | Zaharia et al. | |
| 5,881,859 | A | 3/1999 | Bianchi | |
| 6,530,468 | B2 | 3/2003 | Fischer-Jensen et al. | |
| 7,735,623 | B2 * | 6/2010 | Gonzalez Alemany ................ | B66B 23/04 198/330 |
| 7,954,620 | B2 * | 6/2011 | Winkelhake ....... | A61K 31/4985 198/330 |
| 8,061,215 | B2 | 11/2011 | Caunce et al. | |
| 2002/0038758 | A1 | 4/2002 | Fischer-Jensen et al. | |
| 2004/0194404 | A1 | 10/2004 | Lunardi et al. | |
| 2005/0067253 | A1 | 3/2005 | Miessbacier | |
| 2006/0070846 | A1 * | 4/2006 | Andreas .................. | B66B 23/04 198/335 |
| 2007/0045082 | A1 * | 3/2007 | Ishikawa ................. | B66B 23/04 198/330 |

FOREIGN PATENT DOCUMENTS

| | | | |
|---|---|---|---|
| CN | 101423169 | A | 5/2009 |
| EP | 0528387 | A1 | 2/1993 |
| EP | 0530946 | A1 | 3/1993 |
| WO | 2011088895 | A1 | 7/2011 |

OTHER PUBLICATIONS

Written Opinion for application PCT/US2013/031439, dated Dec. 13, 2013, 5 pages.

Chinese Office Action for application CN 201380076613.7, dated Nov. 7, 2016, 5 pages.

European Search Report for application EP13877802, dated Oct. 18, 2016, 7 pages.

* cited by examiner

SELF-CLAMPING HANDRAIL DRIVE

BACKGROUND

Various types of systems may be used to convey goods or people. For example, a moving walkway located in an airport may be used to quickly get airline customers to destination terminals prior to departure times. A handrail may be used to provide a point or reference or to enable a passenger to balance herself when using the walkway. Handrails typically include a relative stiff plastic or rubber band that has a sliding material (e.g., a coating or fiber band) on the inner side and a more adhesive outer side to enable a quality gripping-surface for the passenger's hand. In some instances, an inner side of a handrail may provide for a drive.

Where space is at a premium, a linear handrail drive system may be used in connection with the walkway. In common applications, handrail drives use an inner side to drive the handrail using certain rollers or wheels to avoid driving marks (fulling marks) on the outer (upper, passenger) side.

BRIEF SUMMARY

An embodiment of the disclosure is directed to a method for providing a self-clamping handrail drive, comprising: providing a variable normal force to the handrail based at least in part on a tension force in the handrail.

An embodiment of the disclosure is directed to a self-clamping handrail device comprising: a belt-handrail compound comprising a first belt, a second belt coupled to the first belt, and a handrail coupled to the second belt, a counter bar and a clamping frame configured to support the belt-handrail compound as the belt-handrail compound passes between the counter bar and the clamping frame, the clamping frame configured to move about a clamping curve based on a tension force applied to the handrail, and the first belt and the second belt applying a normal force to the handrail based at least in part on the tension force.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
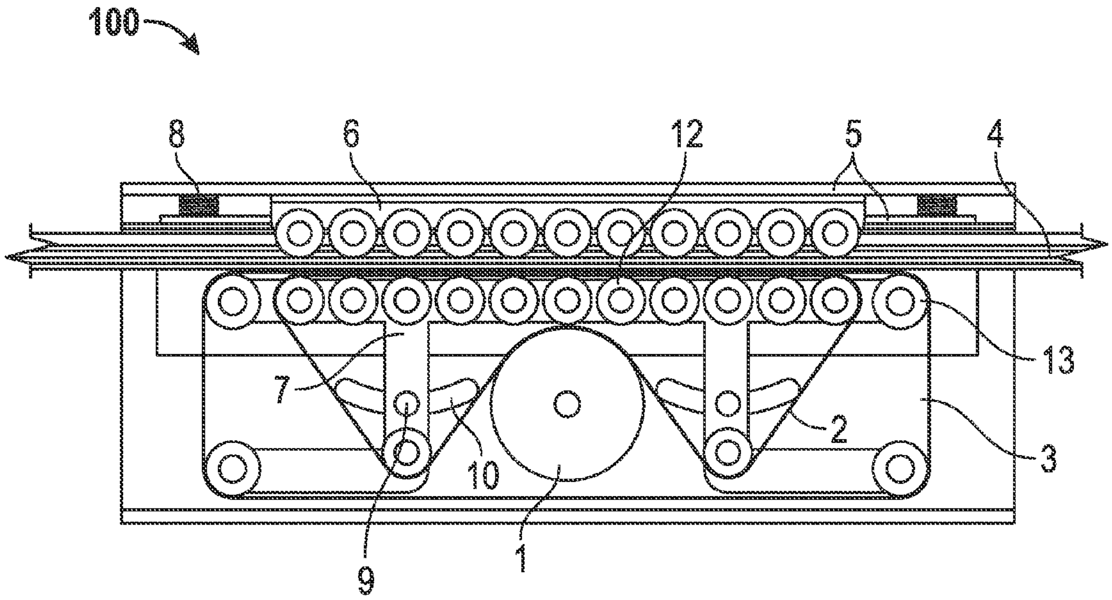
FIG. 1 illustrates an exemplary handrail device in an initial or neutral position in accordance with one or more embodiments.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems and methods are described for providing a self-clamping handrail drive. In some embodiments, the handrail drive may be implemented in connection with a conveying device, such as a walkway or escalator. The handrail drive may be configured to adjust or adapt to varying loads. For example, normal forces applied to a handrail may vary based on applied tension forces that may be a function of a load applied to the handrail. In this respect, normal forces applied to the handrail may be minimized, which may extend operational life of the handrail and may permit the outer surface of the handrail to be used as the driving surface.

FIG. 1 illustrates an exemplary self-clamping handrail device 100 in accordance with one or more embodiments. The handrail device 100 is shown as being in an initial or neutral position, which may be distinguished from an operation position as described further below.

The handrail device 100 may include a main tooth wheel 1 mounted on a housing 5 that may be fixed in an escalator or moving walkway and driven by a main drive belt (not shown) via a pulley (not shown). The main tooth wheel 1 may drive a tooth belt 2. Overlaid on the tooth belt 2 may be a flat or tooth belt 3 that contacts, with a specific coated back, a handrail 4 on the surface that is exposed to and potentially engaged by passengers riding the escalator and drives the handrail 4 in an intended direction. The tooth belt 2, the belt 3, and the handrail 4 may form a belt-handrail compound 2-4 and travel between a clamping frame 7 and a counter bar 6. The clamping frame 7 and the counter bar 6 may include mounted rollers to provide support for the belt-handrail compound 2-4. In an initial or minimal tension force position, the counter bar 6 may be pressed by one or more springs 8 towards the handrail 4 and this pressure may be transmitted to the clamping frame 7. The counter bar 6 may be horizontally (longitudinally) coupled with the clamping frame 7. The counter bar 6 may include one or more (e.g., two) vertically oriented bed stops that may be mounted on the housing 5. The bed stops may be configured to limit the extent of vertical movement of the counter bar 6.

In FIG. 1, in which the handrail drive may be at rest, the counter bar 6 does not touch one of the bed stops and might only be pressed by a relatively low initial spring force (associated with the spring(s) 8) towards the belt-handrail compound 2-4. The force provided by the spring(s) 8 may be selected to be strong enough to provide an initial movement of the clamping frame 7 along a clamping curve 10. The force may be a function of friction relations between the belt 3 and the handrail 4 and may serve as a "minimum force".

At start-up of the handrail drive, inertia and friction in the system may generate tension in the handrail 4 that, through friction between the belts 2 and 3, may cause the clamping frame 7 to move to apply greater normal force until it is sufficient to overcome the inertia and friction. Once moving, the frame 7 may settle into an equilibrium position until the handrail device 100 is loaded with, e.g., passengers.

In some embodiments, the clamping frame 7 may carry or include some or all of the rollers 12 and 13 for the tooth belt 2 and the belt 3, respectively. The clamping frame 7 may be configured to be moved or displaced in a horizontal and/or vertical direction. Movement of the clamping frame 7 may be determined by movement of a roller 9 within the clamping curve 10. In some embodiments, the roller 9 may correspond to a bearing surface, a low friction surface, a slider element, etc. The clamping roller 9 may be fixed on the clamping frame 7. The clamping curve 10, which may correspond to a slot in the housing 5, may be designed or fabricated such that the tooth belt 2 has in every position of the clamping frame 7 the same length. Any curves or movement of the frame 7 may be such that at all points of motion the tension in the belt 2 may be constant (e.g., no stretch). In some embodiments, a clamping curve 10 may be used that is not that strong (e.g., steeper wedge) and when the belt 2 is loosening a little bit, this loosening may be neglected or an idler roller may be implemented. When the clamping frame 7 starts to move or travel along clamping curve 10 normal forces to the handrail 4 and the counter bar 6 may increase immediately. This increase in force, which may serve as a "maximum force", may squeeze or compress the spring(s) 8 until the counter bar 6 touches the upper bed stop on the housing 5 and the counter bar 6 cannot move vertically anymore.

Figure 2:
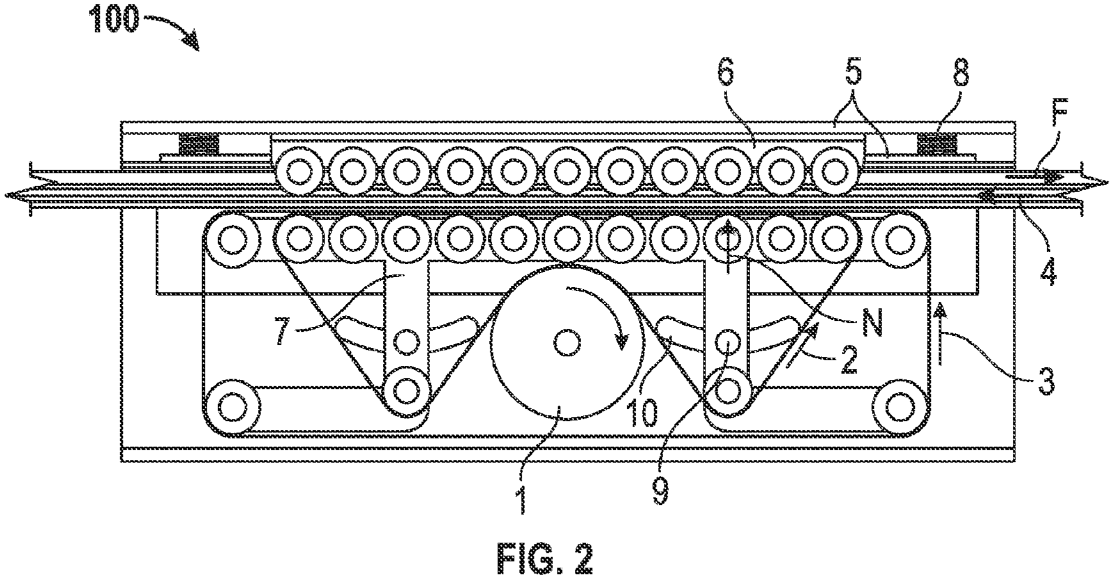
FIG. 2 illustrates an exemplary handrail device in an operating position with a handrail tension force in accordance with one or more embodiments.

Turning now to FIG. 2, the handrail device 100 is shown in operation with moving directions (indicated via the arrows shown) of the tooth wheel 1, the tooth belt 2, the belt 3, and the handrail 4. Also shown in FIG. 2 are the resulting forces (normal N and tension F) on the handrail 4. Due to tension force F, the clamping frame 7 has moved in the direction of the tension force F (e.g., to the right in FIG. 2) relative to the initial or neutral position shown in FIG. 1. The movement of the clamping frame 7 may follow the clamping curve 10 based on a movement or a rolling of the clamping roller 9. The counter bar 6 may move or travel the same horizontal distance as the clamping frame 7. In the event that the counter bar 6 reaches the upper bed stop on the housing 5, the (resultant) forces may be directly loaded to the housing 5 and not the spring 8. As such, the counter bar 6 might not move anymore in a vertical direction. Even though the clamping frame 7 may have moved, the tooth belt 2 may have the same length in this changed position. Similarly, the belt 3 length might not have changed, as the belt 3 system may have moved together with the clamping frame 7.

In the event that the normal force is too high for the handrail material, the counter bar 6 may be adjusted with spring forces. The counter bar 6 may touch the hard bed stops when a passenger load is applied on the handrail 4. The counter bar 6 may return to the initial spring force load position when the handrail is released again.

In FIG. 2, in the event that the handrail 4 tension force F increases, the clamping frame 7 may move or travel in the direction of the tension force F (which would be to the right in FIG. 2) along the clamping curve 10. The pressure on the handrail 4 may increase (potentially at one or more multiples of the increase in tension force F) as a function of a current tangential angle in a contact point between the clamping roller 9 and the clamping curve 10. As a result, a higher normal force N may be realized, which may allow for a higher tension force F to be applied on the handrail 4.

The shape of the clamping curve 10 may act like a wedge, such that a given tension force F on the handrail 4 may result in a multiple higher normal force N on it. As a result, the potential for sliding between the handrail drive and the handrail 4 may be minimized or eliminated as long as the system is not impacted by an inoperability condition (e.g., failure or damage). The normal force N may increase in relation to the tension force F. For example, the increase in the normal force N may be eight to ten times greater than the tension force F. As long as a coefficient of friction between the belt 3 and the handrail 4 is greater than the reciprocal value of this multiple (e.g., greater than ⅛-1/10), no sliding may occur, which may be used to realize a self-clamping effect. The coefficient of friction between the belt 3 and the handrail 4 may be much larger than "normal" steel coefficients of friction, e.g., approximately a number between one and three. As such, the relative flat angle (wedge angle) at the contact point between the clamping roller 9 and the clamping curve 10 may assure a sufficient grip to drive the handrail 4 without slipping or stopping.

When the tension force F decreases, the pressure of the handrail 4 material and the spring 8 force may make the clamping roller 9 move or travel towards the lowest point or the bottom of the clamping curve 10 until a balance of forces is again established. This rebounding may guarantee that an adequate normal force N, related to the tension force F, is applied on the handrail 4. The ability to vary the normal force N based upon load provides the benefit that the normal force N is not required to be maintained at a constant high level corresponding to the maximum normal force needed for a fully loaded escalator, as is the case in conventional linear handrail drives. As a result, there is less pressure on the handrail, reduced wear and this feature permits the outer surface of the handrail to be used as the driving surface.

In FIG. 2, the tension force F is shown as being directed to the right. If the tension force F changes direction (e.g., the tension force F is directed to the left), the same mechanical principles may apply, such that, e.g., the clamping frame 7 may move to the left via the clamping curve 10.

Figure 3:
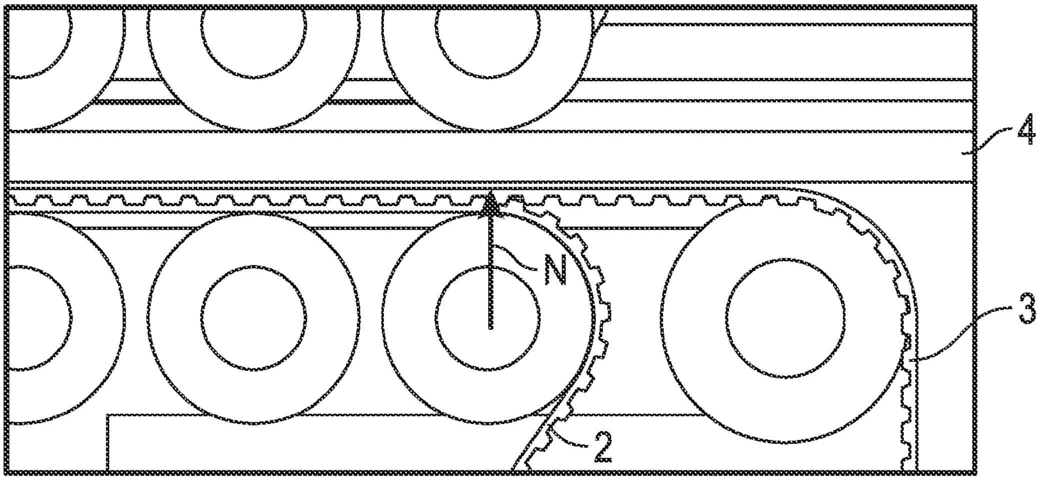
FIG. 3 illustrates an exemplary belt pairing system in accordance with one or more embodiments.

FIG. 3 illustrates a pairing of the tooth belt 2 and the belt 3 in accordance with one or more embodiments. In FIG. 3, the belt 3 is shown as including teeth that may mate with, or engage, teeth of the tooth belt 2. Combining two belts may increase the moment of inertia of a belt system (e.g., the belt compound formed by belts 2 and 3) when supporting the handrail 4 under the normal force N. This may make the belt system stiffer and therefore a bending or deflection between support rollers may be less and a contact surface on the handrail 4 of the pressing rollers may be wider leading to a bigger contact zone with lower pressure. Stated in a slightly different way, use of a stiffer belt may serve to spread force over a greater contact area, thereby lowering pressure imposed on the belt.

In FIG. 3, the teeth of the belts 2 and 3 are engaged in a pressure area where the normal force N is applied from the belts to the handrail 4. Tooth belt 2 may drive the (loose) belt 3. Belt 3 may serve to stiffen the belt system in the pressure zone. In some embodiments, the backside (e.g., the non-tooth side) of the belt 3 that contacts the handrail 4 may be coated with one or more materials (e.g., neoprene). The coating materials may be selected such that a coefficient of friction between the belt 3 and the handrail 4 is relatively large, yet on the other hand the coating may be relatively soft such that a pressure area on the handrail 4 is widened and therefore the grip on the handrail 4 may be smooth, such that marks or damage to the passenger side of the handrail 4 may be avoided.

Figure 4:
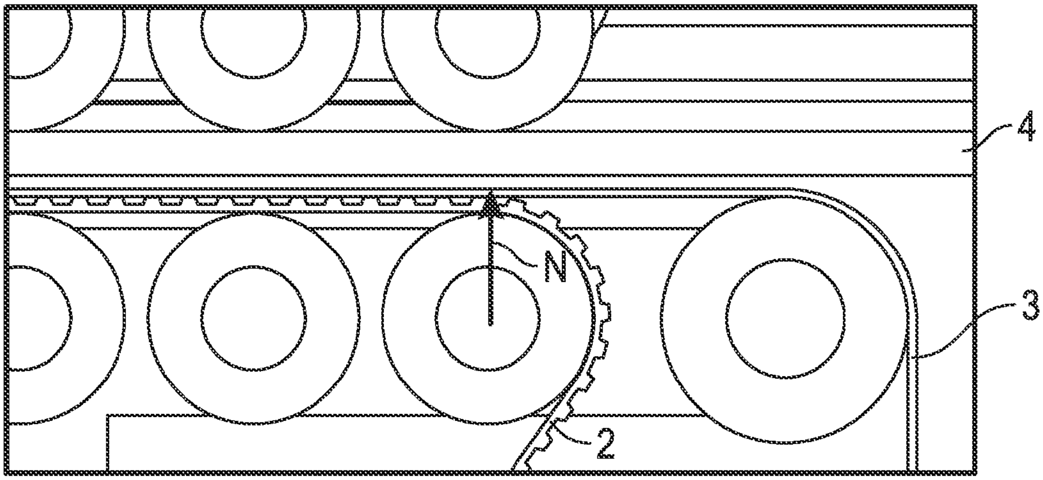
FIG. 4 illustrates an exemplary belt pairing system in accordance with one or more embodiments.

FIG. 4 illustrates a pairing of the tooth belt 2 and the belt 3 in accordance with one or more embodiments. In FIG. 4, the belt 3 is (substantially) flat and does not include the teeth shown in FIG. 3.

In some embodiments, one or both of belts 2 and 3 may be implemented as a Poly-V belt.

In some embodiments, the belt 3 might not be included. For example, the teeth of the tooth belt 2 may (directly) touch the inner surface of the handrail 4; however, it should be noted that this arrangement may increase the risk of deformation of the handrail 4.

In some embodiments, multiple belts may be combined. For example, three or more belts may be combined with each other to increase the stiffness of the belt-handrail compound under a pressure zone.

In some embodiments, one or more rollers may be placed between the counter bar 6 and the housing 5 to reduce friction forces between the longitudinally moving counter bar 6 and the housing 5. Such an arrangement may serve as a bed stop.

In some embodiments, a lever system may be implemented to facilitate the movement provided by the clamping frame 7 described above. Such a lever system may be used in addition to, or as an alternative to, the curve 10. The length of the belt 2 may remain unchanged during movements.

In some embodiments, the clamping frame 7 may move along a curve where a length of the belt 2 is changing. A tension associated with the belt 2 may be established or maintained through use of one or more tension pulleys.

In some embodiments, a belt may be placed on the rollers of the counter bar 6 to provide for better impact on the back side of the handrail 4.

Figure 5:
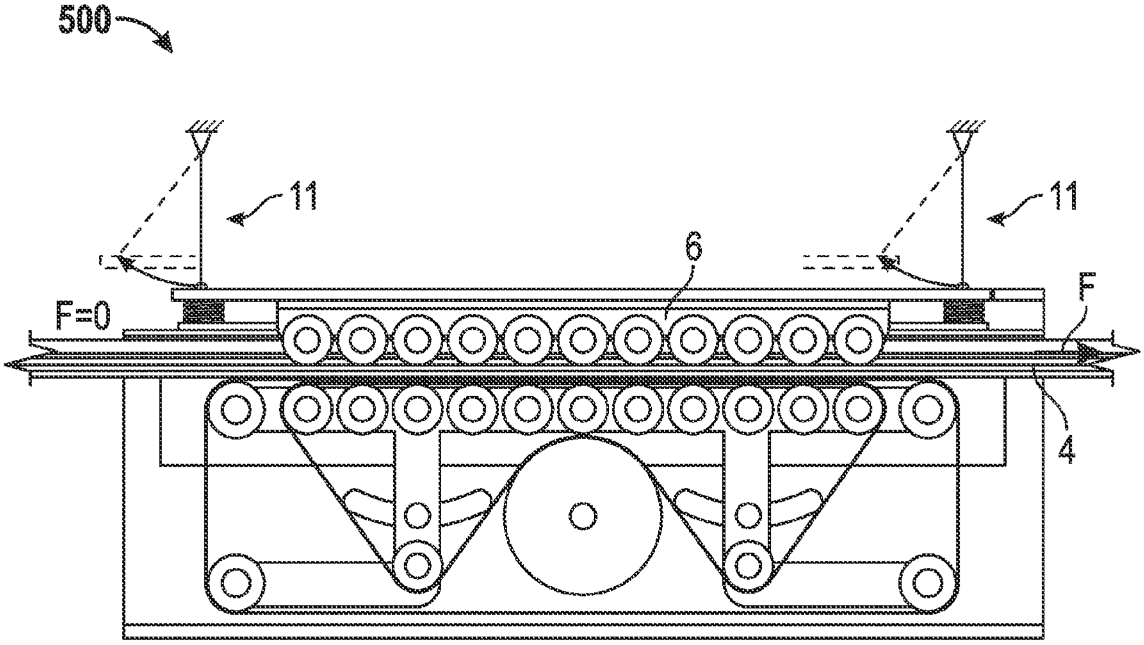
FIG. 5 illustrates an exemplary asymmetrical system in accordance with one or more embodiments.

Turning now to FIG. 5, an asymmetrical system 500 in accordance with one or more embodiments is shown. For example, in one direction (to the right in FIG. 5), the system 500 may clamp and transmit the tension force F to the handrail 4. In a second direction (to the left in FIG. 5), the system 500 may be in a released state or condition; for example, the counter bar 6 may be released by a release mechanism 11 such that no tension force F is applied on the handrail 4. The system 500 may provide a benefit of allowing a tension force F to be selectively applied in a particular direction. A handrail length compensation device may be used between the two asymmetric drives because between them the handrail tension force may approximately be close to zero.

Figure 6:
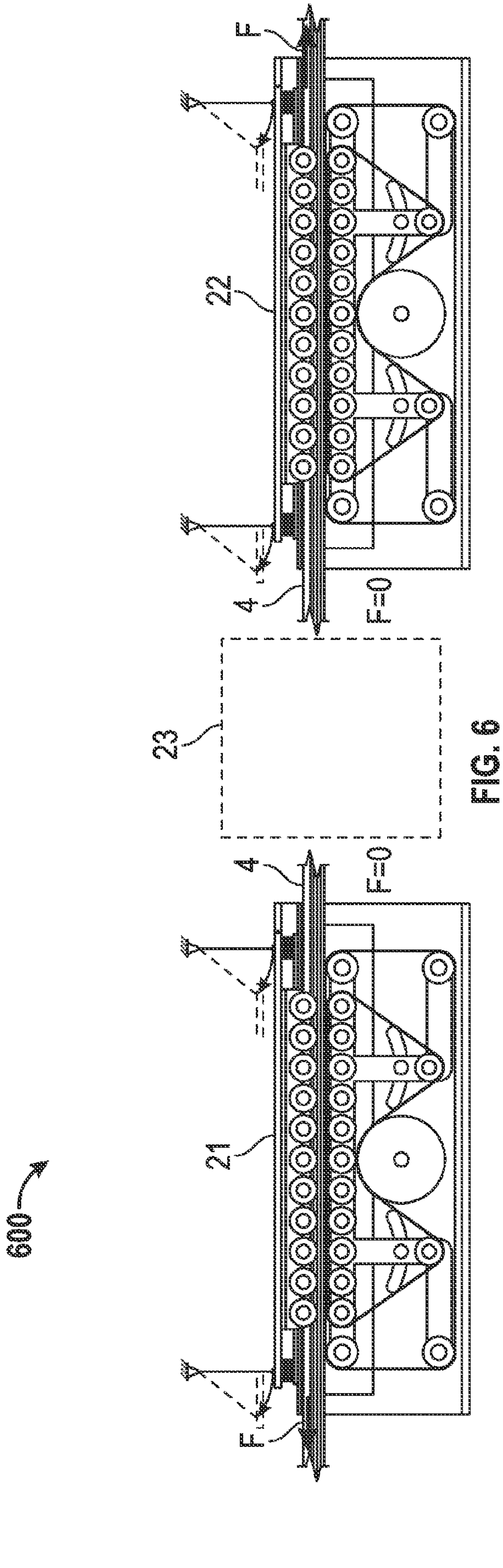
FIG. 6 illustrates an exemplary schematic of a handrail system with asymmetrical systems in accordance with one or more embodiments.

FIG. 6 illustrates an exemplary schematic of a handrail system 600 with asymmetrical systems in accordance with one or more embodiments. In particular, the system 600 includes a left side force clamping system 21 and a right side force clamping system 22. The systems 21 and 22 may correspond to, or be analogous to, the system 500 of FIG. 5.

In some embodiments, the systems 21 and 22 may be applied to a common handrail 4. A handrail length compensation device 23 may be placed between the systems 21 and 22. The systems 21 and 22 may be used to guarantee that regardless in which direction the moving walkway/escalator is running, the part of the handrail 4 that is length compensated in the handrail length compensation device 23 is always tension force free, so that a relatively simple handrail compensation device can be used and the moving walkway/escalator is fully operable in both directions.

Figure 7:
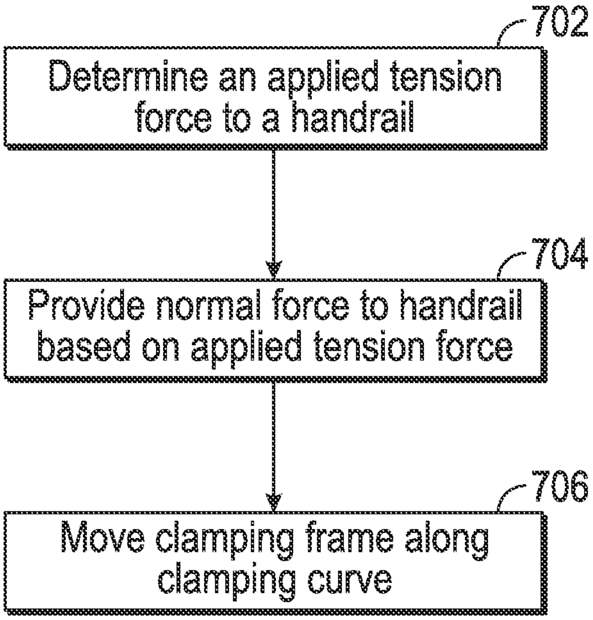
FIG. 7 illustrates a flow chart of an exemplary method in accordance with one or more embodiments.

Turning now to FIG. 7, a flow chart of an exemplary method is shown in accordance with one or more embodiments. The method of FIG. 7 may be used to provide for a self-clamping handrail as described herein. The method of FIG. 7 may be executed by one or more systems or devices, such as those described herein.

In block 702, a determination may be made regarding an amount of tension force (F) that is applied to a handrail. The applied tension force may be a function of a load associated with the handrail. For example, the applied tension force may be based on whether passengers are using the handrail.

In block 704, a normal force (N) may be provided to the handrail. The provided normal force may be based at least in part on the applied tension force of block 702. The provided normal force may be based on one or more springs if, e.g., the applied tension force is less than a threshold level or value. In some embodiments, the normal force may be a multiple of the tension force.

In some embodiments, whether a normal force (N) should be applied may be based on, or a function, of use. For example, if a passenger conveyor is shut down or not in use, normal force (N) may be removed from the handrail, thereby reducing the risk of deforming the outer surface of the handrail.

In block 706, a clamping frame may move along a clamping curve in a direction of the tension force when the tension force increases relative to an initial value. The clamping frame may move through an arc if either a slotted curve or links are used. For example, a clamping frame may move through an arc or clamping curve in a direction of the tension force, e.g., when the tension force increases relative to an initial value.

The method of FIG. 7 is illustrative. In some embodiments, one or more of the blocks or operations (or portions thereof) may be optional. In some embodiments, the operations may execute in an order or sequence different from what is shown. In some embodiments, one or more additional operations not shown may be included.

As described above, in contrast to common handrail drive systems, normal forces may be reduced. For example, normal forces may be selected based on tension forces, one or both of which may be a function of load. In the event that a passenger conveyor (e.g., an escalator or moving walk) is not loaded with passengers and only has to carry frictional forces (e.g., balustrade, newel, return), normal forces may be reduced to a minimum level needed to ensure initial movement of the clamping frame. If the handrail is loaded as a result of passenger use, the normal forces may be increased adequately to avoid a slipping of the handrail. In this respect, a self-clamping handrail drive may be provided. Operational life of the handrail may be increased due to of the ability to vary the applied forces (e.g., normal forces) on the handrail. Normal forces may be even further reduced or de-concentrated due to one or more of: (1) the use of a tooth belt between driving wheels and the handrail, (2) a stiffening of one or more belts or belt compounds (e.g., tooth belt contact with handrail), and (3) frictional pairing between an adhesive passenger side of the handrail and the relatively adhesive belt coating.

The self-clamping systems described herein may adapt to different handrail thicknesses. For example, in the event that the handrail thickness shrinks or decreases, the counter part of the driving belt system may automatically adjust, e.g., via spring or a self-locking, to the thinner handrail. Distance may be accounted for or adjusted in order to provide a relatively low initial (starting) normal force.

In some embodiments, a self-clamping handrail drive may be driven directly with the same tooth (one side tooth) belt that is used for the main drive, which may help to minimize the required space.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. In some embodiments, one or more input/output (I/O) interfaces may be coupled to one or more processors and may be used to provide a user with an interface to an escalator or walkway system. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for providing a self-clamping handrail drive, comprising:
- providing a normal force to the handrail based at least in part on a tension force in the handrail; and
- varying the normal force by moving a clamping frame when the tension force increases relative to an initial value;
- wherein varying the normal force comprises moving the clamping frame along a clamping curve in a direction of the tension force when the tension force increases relative to the initial value.

2. The method of claim 1, wherein the normal force increases in direct relationship with the tension force.

3. The method of claim 2, wherein a coefficient of friction between a belt coupled to the handrail and the handrail is greater than a ratio of the tension force to the normal force in order to provide the self-clamping.

4. The method of claim 1, further comprising:
- coupling a belt to the handrail; and
- wherein the belt includes a coating selected to provide for a particular coefficient of friction between the belt and the handrail.

5. A method for providing a self-clamping handrail drive, comprising:
- providing a variable normal force to the handrail based at least in part on a tension force in the handrail;
- coupling a first belt to the handrail; and
- coupling a second belt to the first belt,
- wherein the second belt comprises teeth that engage the first belt in a pressure area where the normal force is applied to the handrail.

6. The method of claim 5, wherein the first belt comprises teeth that engage the teeth of the second belt.

7. The method of claim 1, further comprising:
- applying a driving force to an outer surface of the handrail, wherein the outer surface is configured to be contacted by a passenger.

8. The method of claim 1, further comprising: driving the handrail via a linear drive.

9. The method of claim 1, further comprising:
- applying a minimum normal force sufficient to drive the handrail at minimum operating loads.

10. A method for providing a self-clamping handrail drive, comprising:
- providing a variable normal force to the handrail based at least in part on a tension force in the handrail;
- wherein the normal force compresses a spring until a counter bar touches an upper bed stop on a housing and the counter bar can no longer move in a vertical direction.

11. A self-clamping handrail device comprising:
- a belt-handrail compound comprising a first belt, a second belt coupled to the first belt, and a handrail coupled to the second belt;
- a counter bar and a clamping frame configured to support the belt-handrail compound as the belt-handrail compound passes between the counter bar and the clamping frame;
- the clamping frame configured to move about a clamping curve based on a tension force applied to the handrail; and
- the first belt and the second belt applying a normal force to the handrail based at least in part on the tension force.

12. The handrail device of claim 11, wherein the clamping curve is configured such that the first belt has in every position of the clamping frame the same length.

13. The handrail device of claim 11, further comprising:
- one or more springs configured to provide a spring force that provides sufficient normal force to lock the belts together via friction.

14. The handrail device of claim 11, further comprising:
- a clamping curve roller mounted on the clamping frame and configured to travel along the clamping curve.

15. The handrail device of claim 11, further comprising:
- a tooth wheel configured to be driven by a main drive belt via a pulley and drive the first belt.

16. The handrail device of claim 11, wherein the first belt comprises teeth that engage the second belt in a pressure area where the normal force is applied to the handrail.

17. The handrail device of claim 16, wherein the second belt comprises teeth that engage the teeth of the first belt.

18. The handrail device of claim 16, wherein the second belt is a flat belt.

19. The handrail device of claim 11, wherein the handrail device is an asymmetrical device configured to clamp in a first direction and release in a second direction.

20. The handrail device of claim 19, wherein the handrail device is coupled to a second asymmetrical handrail device, and wherein the second asymmetrical handrail device is configured to clamp the handrail in the second direction and release in the first direction, and wherein the asymmetrical device is coupled to the second asymmetrical handrail device via a handrail length compensation device.

21. The handrail device of claim 11, wherein the handrail device is implemented as part of at least one of a walkway and an escalator.

22. The handrail device of claim 11, further comprising:
- a link mechanism arranged for the clamping frame to move about the clamping curve.

* * * * *